United States Patent
Kuwano et al.

(10) Patent No.: US 6,819,516 B2
(45) Date of Patent: Nov. 16, 2004

(54) WUS (UNSAFE) DETECTION (KICK BACK SENSING)

(75) Inventors: Hiromichi Kuwano, Setagaya Ku (JP); Kaori Ichikawa, Setagaya Ku (JP)

(73) Assignee: Texas Instruments Incorporated, Dallas, TX (US)

( * ) Notice: Subject to any disclaimer, the term of this patent is extended or adjusted under 35 U.S.C. 154(b) by 644 days.

(21) Appl. No.: 09/732,143

(22) Filed: Dec. 7, 2000

(65) Prior Publication Data

US 2002/0073379 A1 Jun. 13, 2002

(51) Int. Cl.[7] .................................................. G11B 5/02
(52) U.S. Cl. .......................................... 360/67; 360/46
(58) Field of Search ..................................... 360/67, 46

(56) References Cited

U.S. PATENT DOCUMENTS

| | | | |
|---|---|---|---|
| 5,357,379 A | 10/1994 | Gower | |
| 5,982,568 A | 11/1999 | Yamamoto et al. | |
| 5,982,569 A | 11/1999 | Lin et al. | |
| 6,081,396 A | * 6/2000 | Ryat | ............... 360/46 |

* cited by examiner

*Primary Examiner*—David Hudspeth
*Assistant Examiner*—Rocio Colon
(74) *Attorney, Agent, or Firm*—W. Daniel Swayze, Jr.; W. James Brady; Frederick J. Telecky, Jr.

(57) ABSTRACT

An unsafe detection circuit for detecting a kickback signal including an input circuit for inputting a kickback signal, a circuit for detecting the presence or absence of said kickback signal, and a fault detection circuit to respond to said presence or absence of said kickback signal to provide an indication of a fault.

5 Claims, 2 Drawing Sheets

WUS (UNSAFE) DETECTION (KICK BACK SENSING)

FIELD OF THE INVENTION

This invention relates in general to the field of mass storage devices and more particularly to a pre-amplifier and a device for determining faults in a head.

BACKGROUND OF THE INVENTION

A hard disk drive includes a stack of magnetically coded platters that are used for storing information. The magnetically coded platters are mounted together in a stacked position through a spindle which may be referred to as a platter stack. The platter stack is typically rotated by a motor that is referred to generally as a spindle motor or a servo motor. A space is provided between each platter to allow a read/write head or slider to be positioned on each side of the platter so that information may be stored and retrieved. Information is stored on each side of each platter and is generally organized into sector track zones and cylinders. Each of the read/write heads or sliders is mounted into one end of the dedicated suspension arm so that each of the read/write heads may be positioned as desired. The opposite end of each of the suspensions arms is coupled together at the voice coil motor to form one unit or assembly that is positionable by a voice coil motor. Each of the suspensions arms is provided in a fixed position relative to each other. The voice coil motor positions all of the suspensions arms so that the read/write head is properly positioned for reading or writing information. The read/write heads or sliders may move from at least one inner diameter to an outer diameter where data is stored. This distance may be referred to as a data stroke.

Hard disk drives also include a variety of electronic circuitry for processing data input for controlling its overall operation. The electronic circuitry may include a pre-amplifier, a read channel, a write channel, a servo controller, a motor control circuit, a read only memory open (ROM), a random access memory (RAM) and variety of disk control circuitry to control the operation of the hard disk drive and to properly interface the hard disk drive to the system bus. The pre-amplifier may contain a read pre-amplifier and a write pre-amplifier that is also referred to as a write driver. The pre-amplifier may be implemented in a single integrated circuit or may be a separate integrated circuit such as read pre-amplifier, a write pre-amplifier, or a write driver. The disk control circuitry generally includes a separate microprocessor for executing instructions stored in memory to control the operation and interface of the hard disk drive. The hard disk drive performs read, write and servo operations when storing and retrieving data. The write operation includes retrieving data from a system bus and storing to data in the RAM. The microprocessor schedules a series of events to allow the information to be transferred from the ROM to platters through the write channel. Before the information is transferred, the read and write heads are positioned on the appropriate track, and the appropriate sector of the track is located. The data from the RAM is then communicated to the write channel as a digital write signal. The write channel processes the digital write signal and generates an analog write signal. In doing this, the write channel may encode the data so that the data can be more reliably retrieved later. The digital write signal may then be provided to an appropriate read/write head after first being amplified by the pre-amplifier. In read operation, the appropriate sector is read, is located and data that has previously written to the platter is read. The appropriate read/write head senses the changes in the magnetic flux and generates a corresponding analog read signal. The analog read signal is provided back to the electronic circuitry where the pre-amplifier amplifies the analog read signal. The amplified analog read signal is then provided to the read channel where the read channel conditions the signals and detects "zeros" and "ones" from the signal to generate a digital read signal. The read channel may condition the signal by amplifying the signal to an appropriate level using automatic gain control (AGC) technique. The read channel may then filter the signal to eliminate unwanted high noise, equalize the channel, detect "zeros" and "ones" from the signal and format the digital read signal. The digital read signal is then transferred from the read channel and stored in the RAM. The microprocessor may then communicate to the host that data is ready to be transferred. The read channel may be implemented using any of a variety of known or available channels. For example, the read channel may be implemented as a peak detection type read channel or as a more advanced type of read channel utilizing discreet time signal processing. The peak detection read channel involves level detecting the amplified analog read signal and determines if the wave form level is above a threshold level during a sampling window. The discreet time signal processing type read channel synchronously samples the amplified read signal using a data recovery clock. The sample is then processed through a series of mathematical manipulations using signal processing theory to generate the digital read signal. There are several types of discreet time signal processing read channels such as partial response, maximum likelihood (PRML) channel and extended PRML channel or enhanced extended PRML channel, a fixed delay tree search channel and a decision feedback equalization channel.

As the disk platters are moving, the read write heads must align or stay on a particular track. This is accomplished by the servo operations through use of the servo controller provided in a servo control loop. In servo operation, a servo wedge is read from the track that generally includes track identification information and track misregistration information. The track misregistration information may also be referred to as position error information. The position error information may be provided as servo bursts that may be used during read and write operations to ensure that the read write heads are properly aligned on the track. As a result of receiving the position error information, the servo controller generates a corresponding control signal to position the read write heads by positioning the voice coil motor. The track identification information is also used during read and write operations so that a track may be properly identified.

Hard disk drive designers strive to provide higher capacity drives that operate at a high signal to noise ratio and a lower bit error rate. To achieve higher capacities, the aerial density of the data stored on each side of the platter must be increased.

It can be appreciated that there is a need for detecting an open circuit or any kind of fault in the write head. Such a fault would prevent data from being written to the medium and without such a fault indication, the fault would go unnoticed or undetected. Consequently, it is desirable to detect this fault operation. Importantly, it necessary to detect WDI to low open head, a short cross, which is a cross of the X and Y, and short to ground which is when the head is short to ground. The fault, if undetected, could result in loss of data.

SUMMARY OF THE INVENTION

The present invention detects fault conditions during operation of the head for example, during read write operations by a write unsafe detector (WUS). The present invention uses advantageously the inductive property of the head which cause a "kickback" when the current is switched through the head. This kickback causes the voltage on one side of the magnetic head to rise above the normal operating value. The present invention recognizes that this kickback pulse would not be present if the head were open. By detecting the presence of this pulse during each half of the write cycle, a write unsafe circuit can determine if the head is in a normal operation or has opened.

DETAILED DESCRIPTION OF THE PRESENT INVENTION

The following invention is described with reference to figures in which similar or the same numbers represent the same or similar elements. While the invention is described in terms for achieving the invention's objectives, it can be appreciated by those skilled in the art that variations may be accomplished in view of these teachings without deviation from the spirit or scope of the invention.

Figure 5:
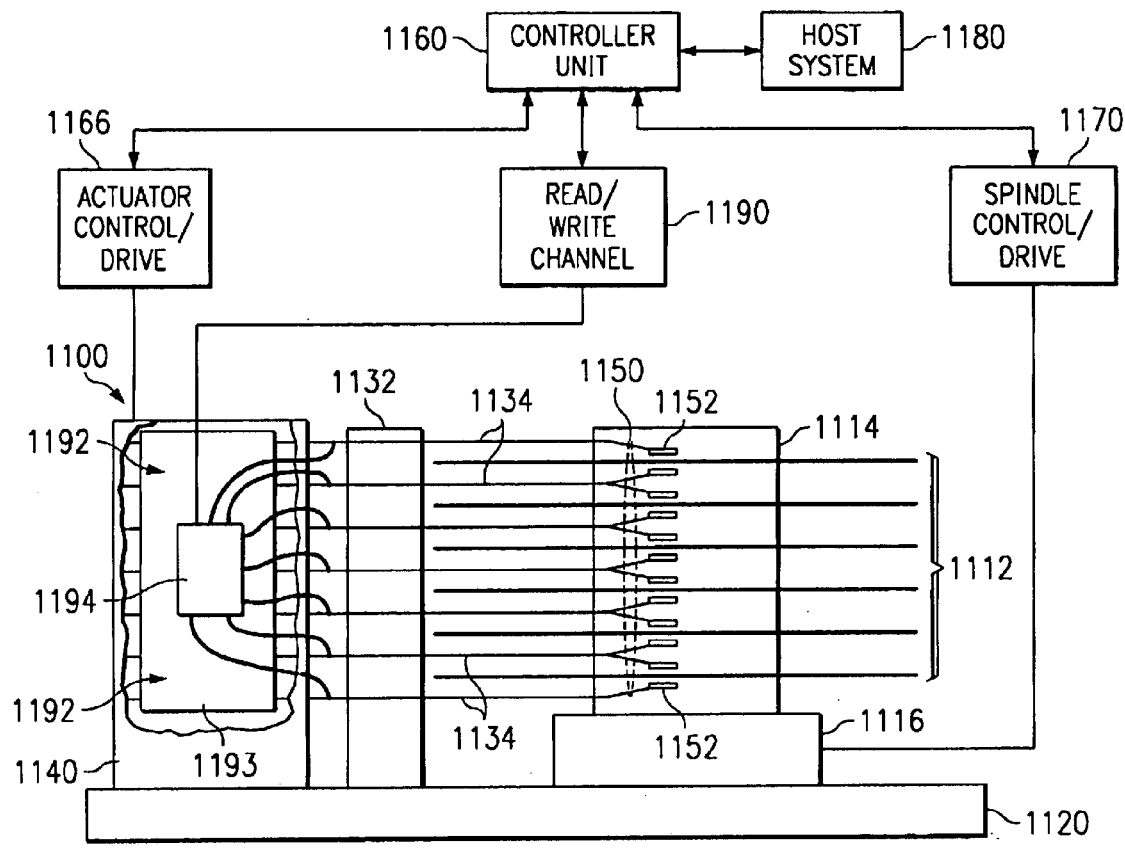
FIG. 5 illustrates a top view of a system of the present invention.
Figure 6:
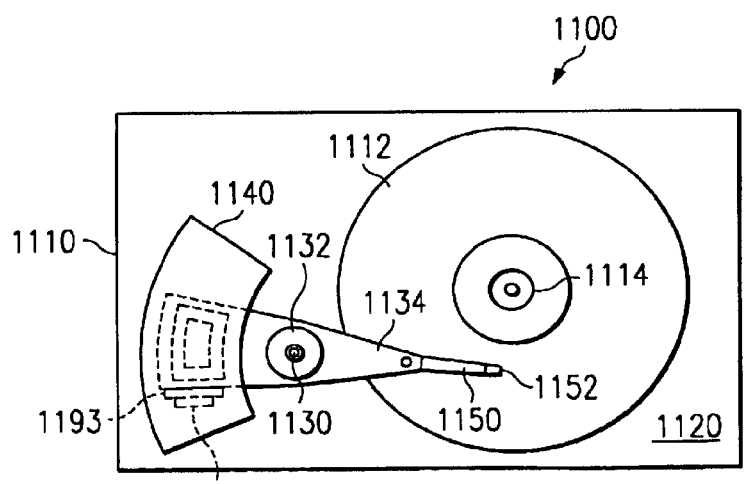
FIG. 6 illustrates a side view of the system of the present invention.

FIGS. 5 and 6 show a side and top view, respectively, of the disk drive system designated by the general reference 1100 within an enclosure 1110. The disk drive system 1100 includes a plurality of stacked magnetic recording disks 1112 mounted to a spindle 1114. The disks 1112 may be conventional particulate or thin film recording disk or, in other embodiments, they may be liquid-bearing disks. The spindle 1114 is attached to a spindle motor 1116 which rotates the spindle 1114 and disks 1112. A chassis 1120 is connected to the enclosure 1110, providing stable mechanical support for the disk drive system. The spindle motor 1116 and the actuator shaft 1130 are attached to the chassis 1120. A hub assembly 1132 rotates about the actuator shaft 1130 and supports a plurality of actuator arms 1134. The stack of actuator arms 1134 is sometimes referred to as a "comb." A rotary voice coil motor 1140 is attached to chassis 1120 and to a rear portion of the actuator arms 1134.

A plurality of head suspension assemblies 1150 are attached to the actuator arms 1134. A plurality of inductive transducer heads 1152 are attached respectively to the suspension assemblies 1150, each head 1152 including at least one inductive write element. In addition thereto, each head 1152 may also include an inductive read element or a MR (magneto-resistive) read element. The heads 1152 are positioned proximate to the disks 1112 by the suspension assemblies 1150 so that during operation, the heads are in electromagnetic communication with the disks 1112. The rotary voice coil motor 1140 rotates the actuator arms 1134 about the actuator shaft 1130 in order to move the head suspension assemblies 1150 to the desired radial position on disks 1112.

A controller unit 1160 provides overall control to the disk drive system 1100, including rotation control of the disks 1112 and position control of the heads 1152. The controller unit 1160 typically includes (not shown) a central processing unit (CPU), a memory unit and other digital circuitry, although it should be apparent that these aspects could also be enabled as hardware logic by one skilled in the computer arts. Controller unit 1160 is connected to the actuator control/drive unit 1166 which is in turn connected to the rotary voice coil motor 1140. A host system 1180, typically a computer system or personal computer (PC), is connected to the controller unit 1160. The host system 1180 may send digital data to the controller unit 1160 to be stored on the disks, or it may request that digital data at a specified location be read from the disks 1112 and sent back to the host system 1180. A read/write channel 1190 is coupled to receive and condition read and write signals generated by the controller unit 1160 and communicate them to an arm electronics (AE) unit shown generally at 1192 through a cut-away portion of the voice coil motor 1140. The AE unit 1192 includes a printed circuit board 1193, or a flexible carrier, mounted on the actuator arms 1134 or in close proximity thereto, and an AE module 1194 mounted on the printed circuit board 1193 or carrier that comprises circuitry preferably implemented in an integrated circuit (IC) chip including read drivers, write drivers, and associated control circuitry. The AE module 1194 is coupled via connections in the printed circuit board to the read/write channel 1190 and also to each read head and each write head in the plurality of heads 1152. The AE module 1194 includes the WUS detector of the present invention.

Figure 2:
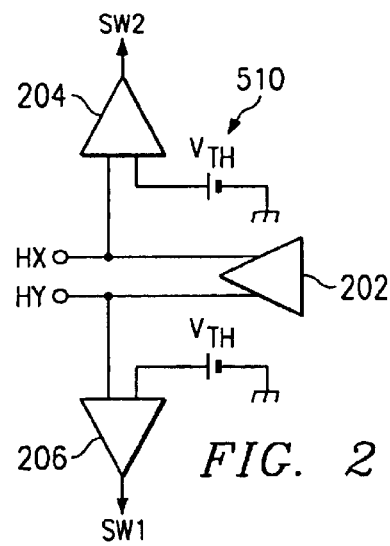
FIG. 2 illustrates a WUS detector of the present invention.
Figure 3:
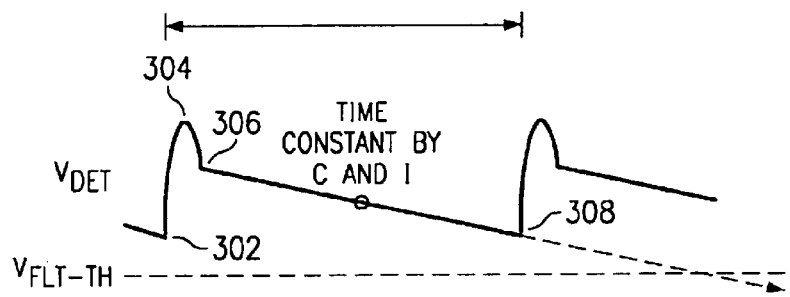
FIG. 3 illustrates a wave form diagram of the present invention.

Turning now to FIG. 3, FIG. 3 illustrates the output signal of pre-amplifier 202. The output signal of pre-amplifier 202 is a differential signal and indicated in FIG. 2 as signal $H_X$ and the signal $H_Y$. A comparator 204 is connected to the output of pre-amplifier 202 to compare the signal $H_X$ with a threshold voltage $V_{TH}$. The $V_{TH}$ is normally set at 5 volts but other voltages could be used. The 5 volt threshold voltage $V_{TH}$ is approximately half of the maximum kickback voltage and consequently can be used to provide a good indication of the kickback voltage. The output of comparator 204 is signal SW2 which indicates when the signal $H_X$ exceeds the threshold voltage $V_{TH}$ when signal to provide an indication of the presence of the kickback voltage. In the absence of the kickback voltage, indicating a fault or a combination of, namely WDI too low, an open head, a short cross, or a short to ground, of the write head, signal SW2 is a zero. Likewise, under the presence of the kickback voltage, the signal SW2 is a logical one. A similar circuit is found with respect to the other output of the differential pre-amplifier 202. Another comparator 206 receives the signal $H_Y$ as the output of differential pre-amplifier 202. Additionally, input to the comparator 206 is a threshold voltage $V_{TH}$ which as described before is approximately 5 volts, and this value is again chosen in that the kickback voltage with respect to the wide differential voltage. Again, when the kickback voltage has occurred, the kickback voltage normally will exceed the threshold voltage $V_{TH}$ and the comparator 206 will output a logical one as signal SW1 to indicate that the kickback signal is present. In the absence of the kickback's signal, the threshold voltage is not received and signal SW1 is a logical zero to indicate a fault.

Figure 1:
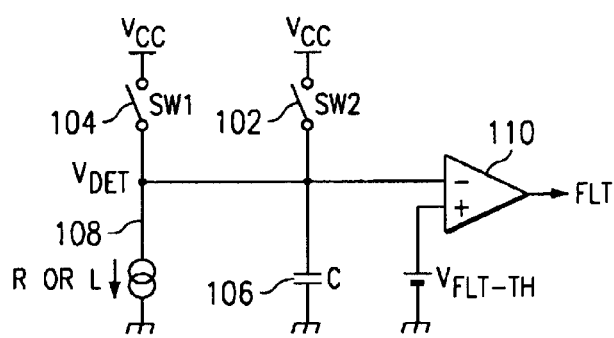
FIG. 1 illustrates a WUS detector of the present invention.

Turning now to FIG. 1, FIG. 1 illustrates two switches, switch 102 and switch 104 being connected to voltage $V_{CC}$. The switch 104 is activated by signal SW1 and consequently is connected to comparator 204. When signal SW2 is a logical one, switch 102 closes allowing current to flow to capacitor 106; this raises the voltage on capacitor 106, raising voltage $V_{TH}$. When switches 104 and 106 are open, voltage $V_{DET}$ falls as a result of current flow out of capacitor 106. Likewise, switch 104 is controlled by signal SW1 and correspondingly is connected to comparator 206. When comparator 206 outputs a logical one as signal SW1, switch 104 closes again allowing a voltage to form on capacitor 106 by the current flowing into capacitor 106. The voltage on capacitor 106 is designated as voltage $V_{DET}$. A current generator 108 is connected in parallel with capacitor 106. Both current generator 108 and capacitor 106 are connected to switch 104 and switch 102. Switch 102 and switch 104 are connected to comparator 110 to provide a fault signal (FLT) to indicate that there has been a WDI fault, an open head fault, a short cross fault. Additionally, input to comparator 110 is a threshold voltage equal to $V_{FLT-TH}$.

Figure 4:
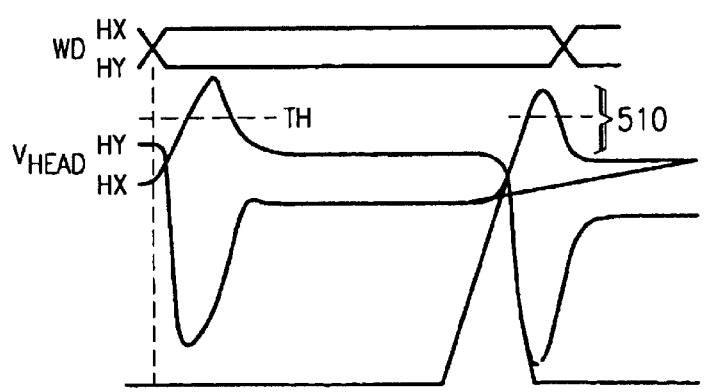
FIG. 4 illustrates a wave form diagram of the present invention.

FIG. 4 illustrates a wave form showing the voltage $V_{DET}$ as a function of time. The voltage $V_{DET}$ at position 302 is low. At position 302 a kickback voltage has been received and either switch 104 or switch 102 closes causing $V_{DET}$ to rise to position 304. At position 304, the kickback voltage reaches its peak as well as voltage $V_{DET}$ and begins to decrease until position 306. The kickback voltage is below the threshold voltage and both switch 102 and switch 104 closes at position 306. The voltage $V_{DET}$ decreases as a result of current flowing from the capacitor to the current generator 108.

FIG. 4 illustrates the WDI voltage for both $H_X$ and $H_Y$. Additionally, it shows the corresponding head voltage.

The switch 102 and switch 104 when connected to $V_{CC}$ provide current to capacitor 106 to increase the voltage on capacitor, when switch 102 and 104 are both disconnected from capacitor 106. The voltage or capacitor 106 drop as a result of current flowing from capacitor 106 to current source 108.

A voltage $V_{DET}$ decreases at position 308 as a result of current flowing from the capacitor to the current generator 108 and finally go below voltage $V_{TH}2$ when no SW1 and SW2 are generated. Then, FLT signal is generated by comparator 101.

What is claimed is:

1. An unsafe detection circuit for detecting an absence of a kickback signal; comprising:

an input circuit for inputting a kickback signal;

a circuit for detecting the presence or absence of said kickback signal; and a fault detection circuit to respond to said presence or absence of said kickback signal to provide an indication of a fault, wherein said fault detector includes a capacitor to hold said nonfault signal; and wherein said fault detector includes switch response to said kickback signal to charge said capacitor.

2. An unsafe detection circuit as in claim 1 wherein said circuit for detecting said kickback signal includes a threshold circuit.

3. An unsafe detection circuit as in claim 1 wherein said circuit for detecting said kickback signal includes a capacitor.

4. An unsafe detection circuit as in claim 1 wherein said kickback signal includes a differential signal.

5. An unsafe detection circuit as in claim 1 wherein said input circuit includes a pre-amplifier.

\* \* \* \* \*